US012665279B2

(12) United States Patent

Liu et al.

(10) Patent No.: US 12,665,279 B2

(45) Date of Patent: Jun. 23, 2026

(54) BASE STATION ANTENNA

(71) Applicant: Outdoor Wireless Networks LLC, Claremont, NC (US)

(72) Inventors: Maosheng Liu, Suzhou (CN); Shida Wang, Suzhou (CN); PuLiang Tang, Suzhou (CN); Hangsheng Wen, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 111 days.

(21) Appl. No.: 18/651,731

(22) Filed: May 1, 2024

(65) Prior Publication Data

US 2024/0380093 A1 Nov. 14, 2024

(30) Foreign Application Priority Data

May 11, 2023 (CN) ......................... 202310531711.0

(51) Int. Cl.

*H01Q 1/02* (2006.01)
*H01Q 1/42* (2006.01)

(52) U.S. Cl.

CPC ................. *H01Q 1/02* (2013.01); *H01Q 1/42* (2013.01)

(58) Field of Classification Search

CPC ............ H01Q 1/02; H01Q 1/246; H01Q 1/42; H01Q 15/14

See application file for complete search history.

(56) References Cited

U.S. PATENT DOCUMENTS

2018/0277921 A1* 9/2018 Ming ........................ H01Q 1/12
2020/0251815 A1* 8/2020 Liu ......................... H01Q 1/246

FOREIGN PATENT DOCUMENTS

CN 210576412 U * 5/2020 ............. H01Q 1/246

* cited by examiner

*Primary Examiner* — Hoang V Nguyen
(74) *Attorney, Agent, or Firm* — Myers Bigel, P.A.

(57) ABSTRACT

The present application relates to a base station antenna, where the base station antenna includes a radome and a reflector assembly housed within the radome having an open upper end portion that is closed by an upper end cap, the base station antenna further has a ventilation system that includes a flow channel disposed in the upper end cap or disposed between the upper end cap and the upper end portion of the radome, and the flow channel is configured for venting from the inside of the radome through the flow channel to an external environment. The base station antenna can achieve improved heat dissipation performance.

19 Claims, 8 Drawing Sheets

BASE STATION ANTENNA

RELATED APPLICATION

The present application claims priority from and the benefit of Chinese Patent Application No. 202310531711.0, filed May 11, 2024, the disclosure of which is hereby incorporated herein by reference in full.

TECHNICAL FIELD

The present invention relates to the field of communication devices, and more particularly, to a base station antenna.

BACKGROUND ART

A cellular communication system may be used to provide wireless communication to mobile users. The cellular communication system may include a plurality of base stations, and each base station may provide a wireless cellular service for a designated coverage area (generally referred to as a "cell"). Each base station may include one or more base station antennas, and the base station antenna may be used to transmit radio frequency (RF) signals to a user located in a cell served by the base station and receive radio frequency signals from the user. The base station antenna may be a directional device that can converge radio frequency energy transmitted in certain directions or received from certain directions.

As radio communications technology develops, improved miniaturization and integration of the base station antenna is expected. Therefore, each base station antenna can only occupy a smaller mounting space with the same number of base station antennas, or a larger number of base station antennas can be mounted with the same size of mounting space. However, with the improved miniaturization and integration of the base station antenna, heat dissipation of the base station antenna has become a serious challenge. The internal temperature within the radome of the base station antenna being controlled within an appropriate range may be critical for the normal operations of the base station antenna.

In some cases where a base station antenna is known in practice, the radome of the base station antenna is substantially sealed at its upper end portion by an upper end cap, and additionally, a reflector assembly that is substantially closed circumferentially is also substantially closed by a support plate on its upper end portion proximate the upper end portion of the radome. As a result, the air in the inner space of the reflector assembly may be rapidly heated through operation of the base station antenna, and the heated air cannot escape or can only escape very slowly from the inner space, and is then blocked within a space within the radome and outside the reflector assembly. Particularly when such base station antennas are exposed to sunlight, perhaps when the ambient temperature of the base station antennas is also high, especially during midsummer, the temperature within the radome of the base station antennas may be so high that the base station antennas operate poorly or even need to be temporarily stopped. In addition, this is not conducive to the service life of the base station antenna.

SUMMARY OF THE INVENTION

A purpose of the present application may be to propose a base station antenna, whereby defects associated with poor heat dissipation of the base station antenna can be at least partially eliminated.

This purpose is addressed by a base station antenna, where the base station antenna includes a radome and a reflector assembly housed within the radome having an open upper end portion that is closed by an upper end cap, the base station antenna has a ventilation system that includes a flow channel disposed in the upper end cap or disposed between the upper end cap and the upper end portion of the radome, and the flow channel is configured for venting from the inside of the radome through the flow channel to an external environment.

By arranging an appropriate ventilation system in the base station antenna according to the present application, the heated air within the radome may flow faster to the external environment and thus emit heat accumulated within the radome to the external environment so that electrical and/or electronic components within the radome can operate at the appropriate temperature.

In some embodiments, the base station antenna may be a small cell base station antenna.

In some embodiments, the base station antenna may be a base station antenna based on 5G technology.

In some embodiments, the base station antenna may include a plurality of flow channels distributed circumferentially, in particular evenly, with reference to a longitudinal central axis of the base station antenna. While a unique flow channel is possible in theory, two or more flow channels are preferred. The quantity of flow channels may be selected according to actual needs, and in principle, any quantity of flow channels may be set.

In some embodiments, the base station antenna may include a plurality of first spacers and a plurality of second spacers distributed circumferentially with reference to the longitudinal central axis of the base station antenna, the first spacers are disposed between an edge of the upper end portion of the radome and an inner bottom surface of the upper end cap, and the second spacers are disposed between an outer peripheral surface of the upper end portion of the radome and an inner peripheral surface of a peripheral wall of the upper end cap, so that the plurality of flow channels are formed between the upper end cap and the upper end portion of the radome.

In some embodiments, each first spacer and a corresponding second spacer may form an L-shaped member.

In some embodiments, the L-shaped member may be integrally molded with the upper end cap, in particular through an injection molding process.

In some embodiments, the L-shaped member may be a separate member from the upper end cap.

In some embodiments, the L-shaped member may be integrally molded with the radome.

In some embodiments, the upper end cap may be fastened on the upper end portion of the radome by a plurality of fasteners, preferably, each fastener passes through the peripheral wall of the upper end cap and a peripheral wall of the radome between two corresponding L-shaped members.

In some embodiments, the fasteners may be screws, pins, rivets, blind rivets, or push rivets.

In some embodiments, the upper end cap may have the one or more flow channels.

In some embodiments, the upper end cap may be constructed in a two-piece manner, for example, may include two plastic components. The two plastic components may be fixedly connected to one another by press fit and/or by fasteners and/or by shape fit.

In some embodiments, the flow channel may have an outlet directed downward.

In some embodiments, the flow channel may have one generally radially extending first section and one generally axially extending second section, and the first and second sections transition from one another via a cambered transitional section.

In some embodiments, the flow channel may have an S-shaped extension direction, and a direction of an outlet of the flow channel is directed upward, or the direction of the outlet of the flow channel has an upward directed component, in particular primarily having an upward directed component.

In some embodiments, the flow channel may be provided with a drop gap for discharging droplets from the flow channel in a section of the upper end cap radially beyond the radome, with reference to the longitudinal central axis of the base station antenna.

In some embodiments, the upper end cap has an annular section radially beyond the radome with reference to the longitudinal central axis of the base station antenna, the annular section has a planar upper surface and a lower surface, and the lower surface has a planar first annular portion radially interior and a second annular portion gathered from the first annular portion towards the planar upper surface and radially outward of the flow channel, where the outlet of the flow channel is routed through the planar upper surface.

In some embodiments, the flow channel may be provided with a drop gap for discharging droplets from the flow channel.

In some embodiments, the drop gap may be branched from the flow channel and routed from the first annular portion.

In some embodiments, the base station antenna may include a fan disposed on an inner bottom surface of a bottom of the upper end cap, and the fan is configured to forcibly transport air inside the radome toward the flow channel.

In some embodiments, the base station antenna may include a solar cell disposed on an outside top surface of the bottom of the upper end cap, and the solar cell is configured to supply power to the fan.

In some embodiments, the solar cell and fan are capable of being manipulated such that drive power of the fan is related to light intensity of sunlight incident on the solar cell. In this way, the base station antenna can be adaptively ventilated, inter alia, with respect to light intensity. Typically, the higher the lighting intensity, the poorer the heat dissipation conditions of the base station antenna, and the greater the need for the fan to facilitate the ventilation of the base station antenna and thereby the heat dissipation of the base station antenna.

In some embodiments, the reflector assembly may be circumferentially enclosed by a plurality of reflectors and be substantially closed circumferentially with reference to the longitudinal central axis of the base station antenna.

In some embodiments, the reflector assembly may be circumferentially enclosed by four reflectors, where each reflector may be constructed substantially flat. The reflector assembly may have a substantially square cross-section.

In some embodiments, the reflector assembly may include two reflective plates having a semi-circular cross-section, the radiator assembly having a substantially circular cross-section.

In some embodiments, the reflector assembly may be circumferentially enclosed by six reflectors, where each reflector may be constructed substantially flat. The reflector assembly may have a substantially positive hexagonal cross-section.

In some embodiments, the reflector assembly may have an annular support member on an upper end portion thereof adjacent to the upper end portion of the radome. The support member may be constructed substantially squarely and have a substantially square central opening.

In some embodiments, the radome may have an open lower end portion, the lower end portion of the radome may be closed by a lower end cap, and the lower end cap has a vent opening.

The above-mentioned technical features, the technical features to be mentioned below and the technical features shown separately in the drawings may be arbitrarily combined with each other as long as the combined technical features are not contradictory. All feasible feature combinations are technical contents clearly recorded herein. Any one of a plurality of sub-features contained in the same sentence may be applied independently without necessarily being applied together with other sub-features.

BRIEF DESCRIPTION OF ATTACHED DRAWINGS

The present disclosure will be explained in more detail by means of exemplary and not-limiting embodiments with reference to the schematic drawings attached.

DETAILED DESCRIPTION OF SPECIFIC EMBODIMENTS

Figure 2:
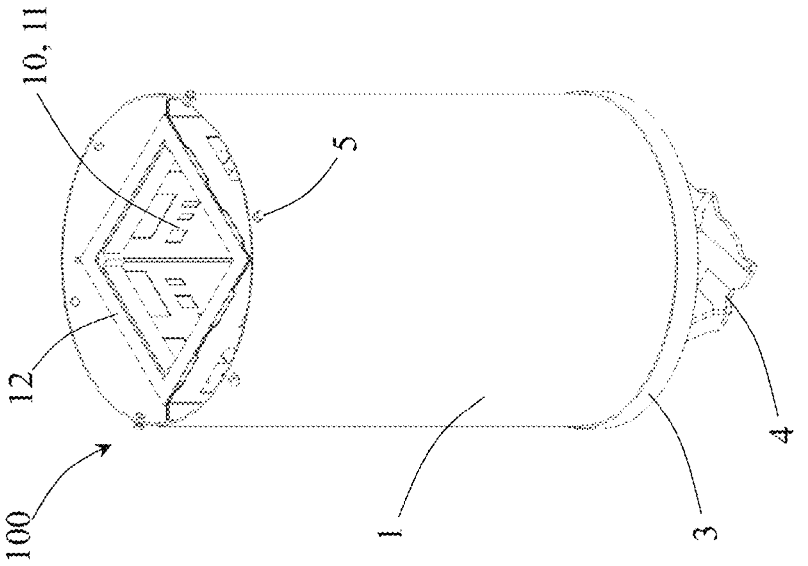
FIG. 2 is a perspective view of the base station antenna of FIG. 1 as an upper end cap is hidden.
Figure 1:
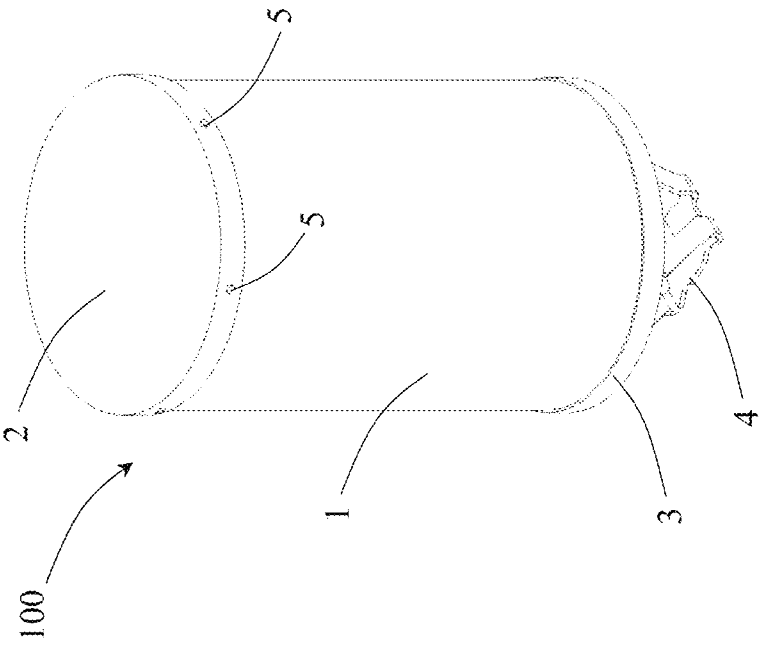
FIG. 1 is a perspective view of a base station antenna according to an embodiment of the present disclosure.
Figure 4:
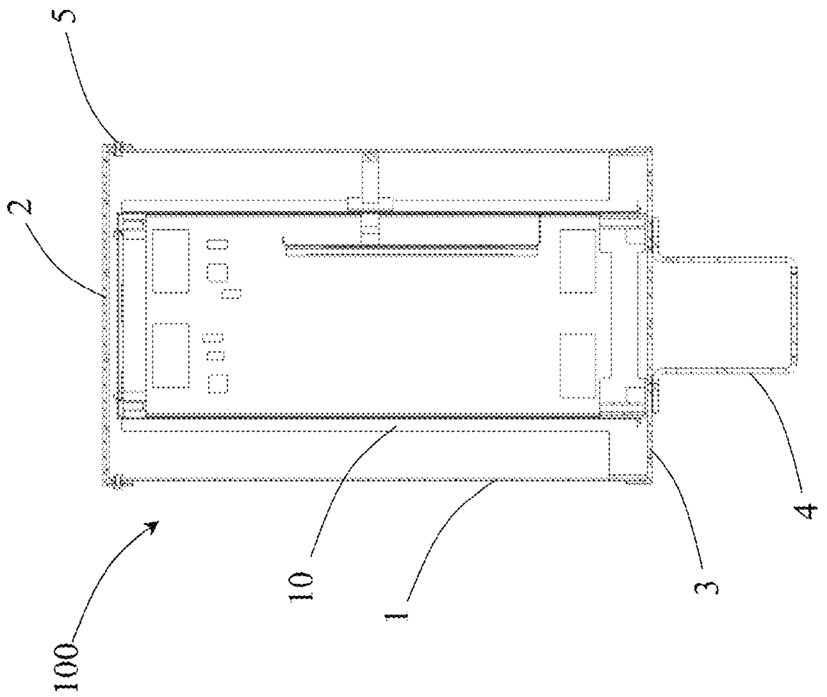
FIG. 4 is a longitudinal cross-sectional view of the base station antenna of FIG. 1.
Figure 3:
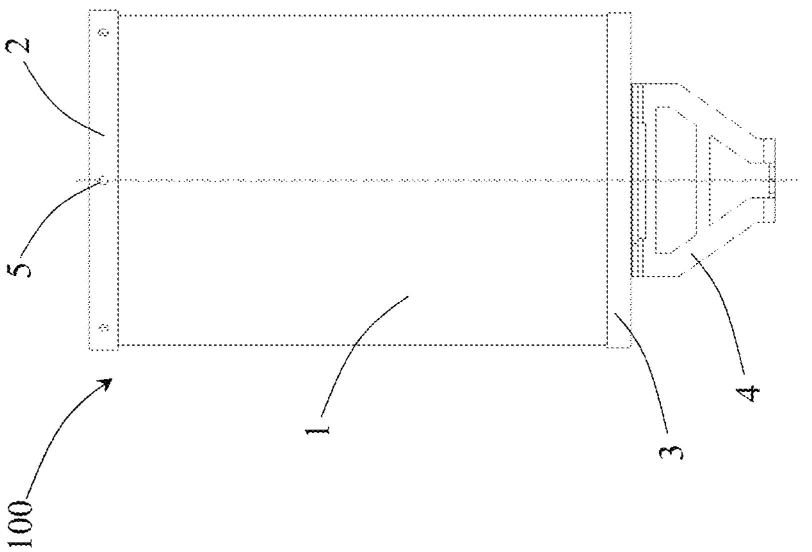
FIG. 3 is a front view of the base station antenna of FIG. 1.

Exemplary examples of the present application will be described below with reference to the attached drawings.

However, it should be understood that the present application may be presented in many different ways and is not limited to the specific examples described below. It should also be understood that the examples disclosed in the present disclosure may be combined in various ways so as to provide more additional examples. In all the attached drawings, the same reference signs may represent the same or functionally identical elements.

As shown in FIGS. 1-4, a base station antenna 100 may be a cylindrical, small cell antenna. The base station antenna 100 may be based on a 5G communication technology. In other embodiments not shown, the base station antennas may be constructed in a generally square shape and therefore have a generally rectangular cross-section.

The base station antenna 100 may include a cylindrical radome 1 within which a reflector assembly 10 is housed. The reflector assembly 10 may be surrounded by four reflectors 11, each reflector 11 may have a substantially identical width and may be constructed substantially flat, and therefore, the reflector assembly 10 may have a generally square cross-section. The reflector assembly 10 may further include an annular support member 12 disposed on an open upper end portion of the reflector assembly 10. The support member 12 has a large central opening such that the inner space of the reflector assembly 10 is in communication with a space outside the reflector assembly 10 and within the radome 1 through a central opening of the support member 12, and air in the inner space of the reflector assembly 10 may flow out via the central opening of the support member 12. The support member 12 may aid in the overall rigidity of the reflector assembly 10 while supporting the reflector assembly 10 on the radome 1. A radiator array (not shown herein) may extend forward from each reflector 11 of the reflector assembly 10. The longitudinal axis of each radiator may be generally perpendicular to a corresponding reflector 11.

The radome 1 may have an open upper end portion and an open lower end portion. The upper end portion of the radome 1 may be closed by an upper end cap 2 and the upper end cap 2 may be securely connected to the radome 1 by way of a fastener 5. In an exemplary embodiment, six fasteners 5 are disposed evenly distributed circumferentially. The fasteners 5 may be, for example, screws or rivets. The lower end portion of the radome 1 may be closed by a lower end cap 3 and the lower end cap 3 may be securely connected to the radome 1 by a fastener (not shown). In addition, the base station antenna 100 may be installed in a cantilever type by a bracket 4 secured on the lower end cap 3, such as in the base station.

In the embodiment as shown in FIGS. 1-6, the base station antenna 100 has a ventilation system including a plurality of flow channels disposed between the upper end cap 2 and the upper end portion of the radome 1, the flow channels being configured for venting from the inside of the radome 1 through the flow channel to an external environment. Therefore, the base station antenna 100 may include a plurality of first spacers 25 and a plurality of second spacers 26 evenly distributed circumferentially, the first spacers 25 are disposed between an edge of the upper end portion of the radome 1 and an inner bottom surface 21 of a bottom 20 of the upper end cap 2, and the second spacers 26 are disposed between an outer peripheral surface of the upper end portion of the radome 1 and an inner peripheral surface of a peripheral wall 22 of the upper end cap. Each first spacer 25 and a corresponding second spacer 26 may form an L-shaped member 24. Advantageously, each L-shaped member 24 may be integrally molded with the upper end cap 2, especially in an injection molding process.

Figure 5:
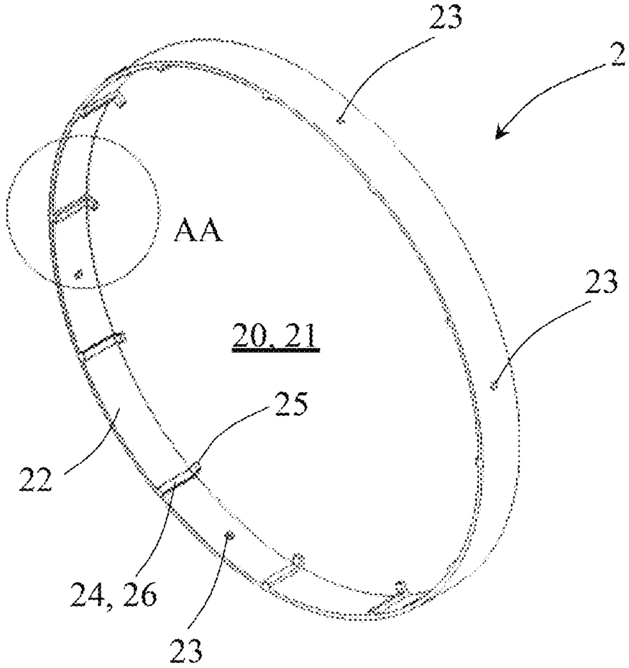
FIG. 5 is a perspective view of an upper end cap of the base station antenna in FIG. 1.
Figure 6:
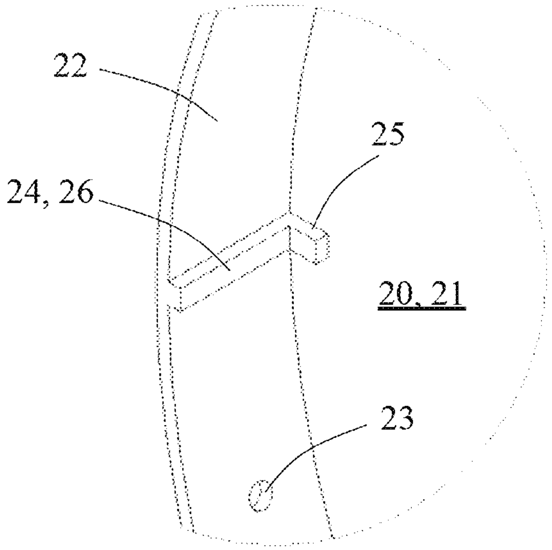
FIG. 6 is an enlarged view of a local portion AA of FIG. 5.
Figure 7:
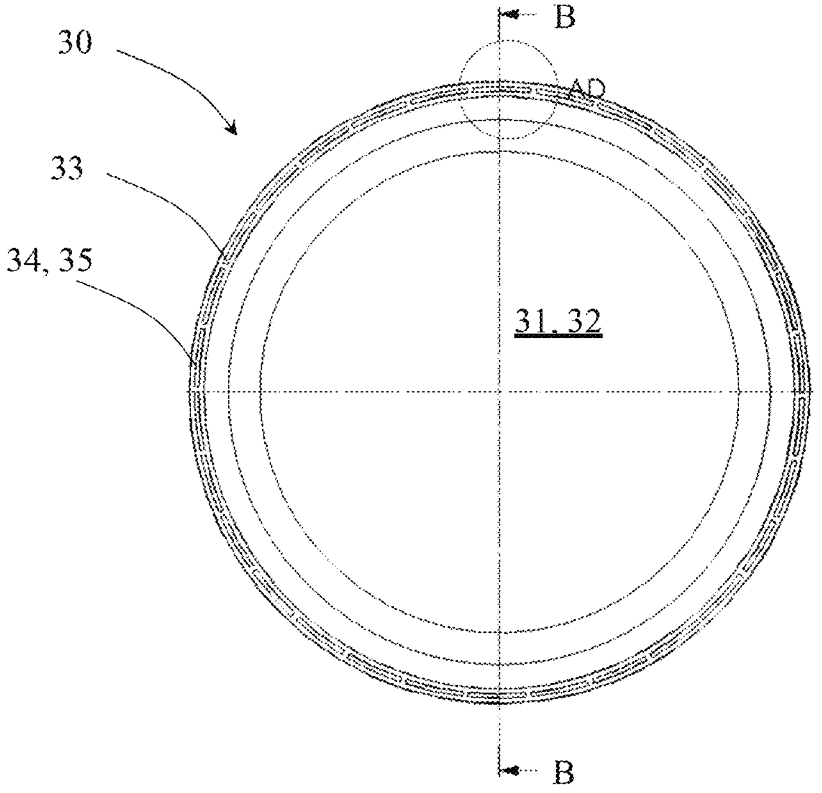
FIG. 7 is a bottom view of an upper end cap according to a second embodiment of the present application.
Figure 8:
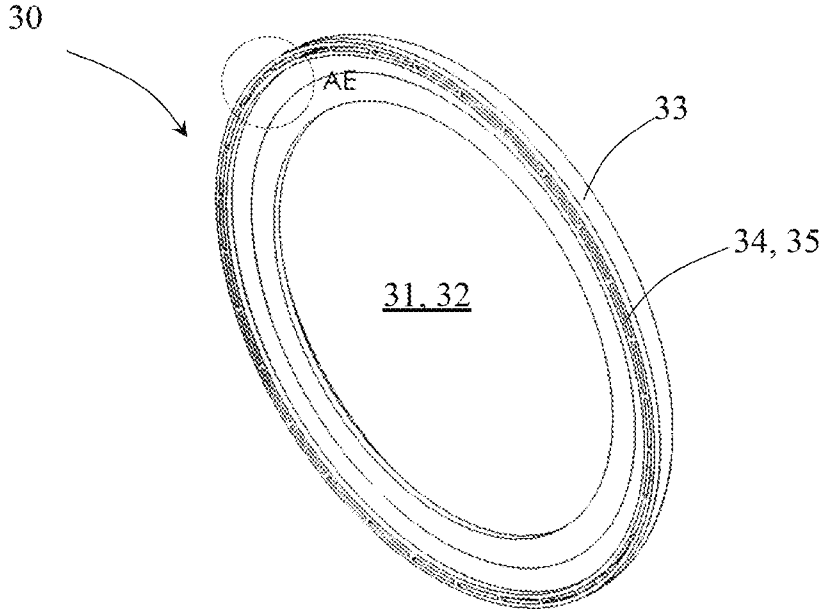
FIG. 8 is a perspective view of the upper end cap of FIG. 7.
Figure 9:
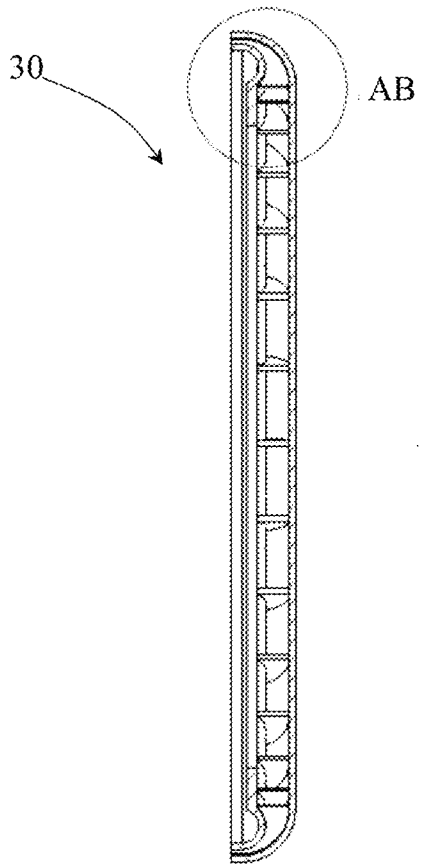
FIG. 9 is a longitudinal cross-sectional view of the upper end cap of FIG. 7 along a section line B-B.
Figure 10:
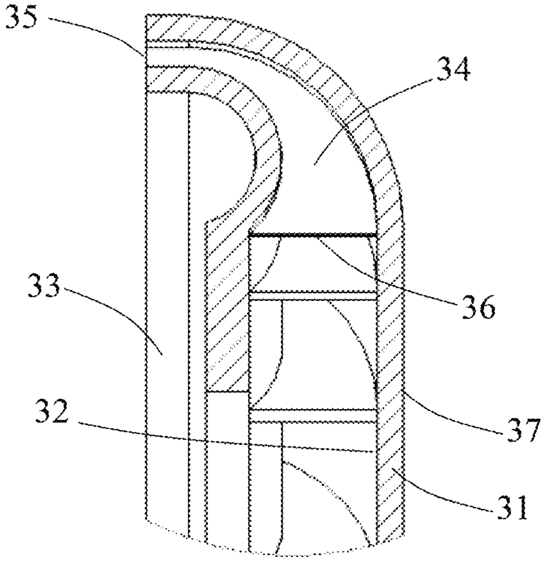
FIG. 10 is an enlarged view of a local portion AB of FIG. 9.
Figure 11:
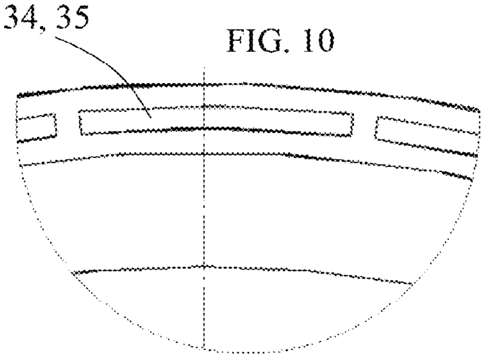
FIG. 11 is an enlarged view of a local portion AD of FIG. 7.
Figure 12:
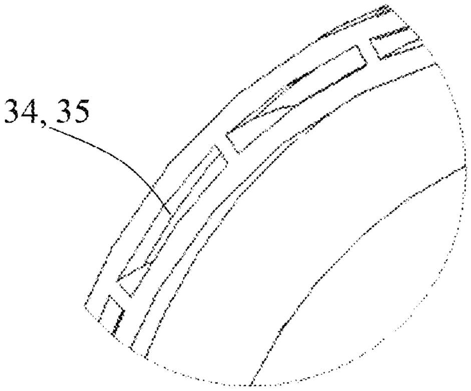
FIG. 12 is an enlarged view of a local portion AE of FIG. 8.
Figure 13:
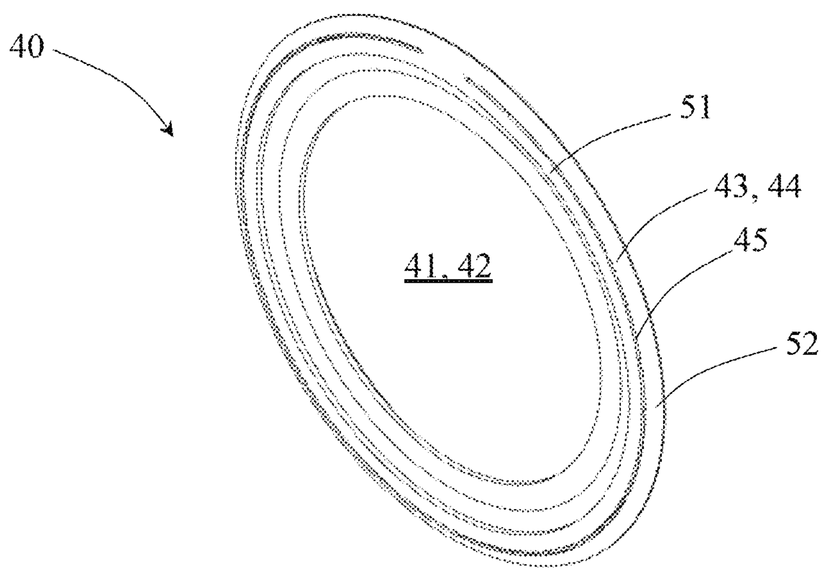
FIG. 13 is a perspective view of an upper end cap according to a third embodiment of the present application.
Figure 14:
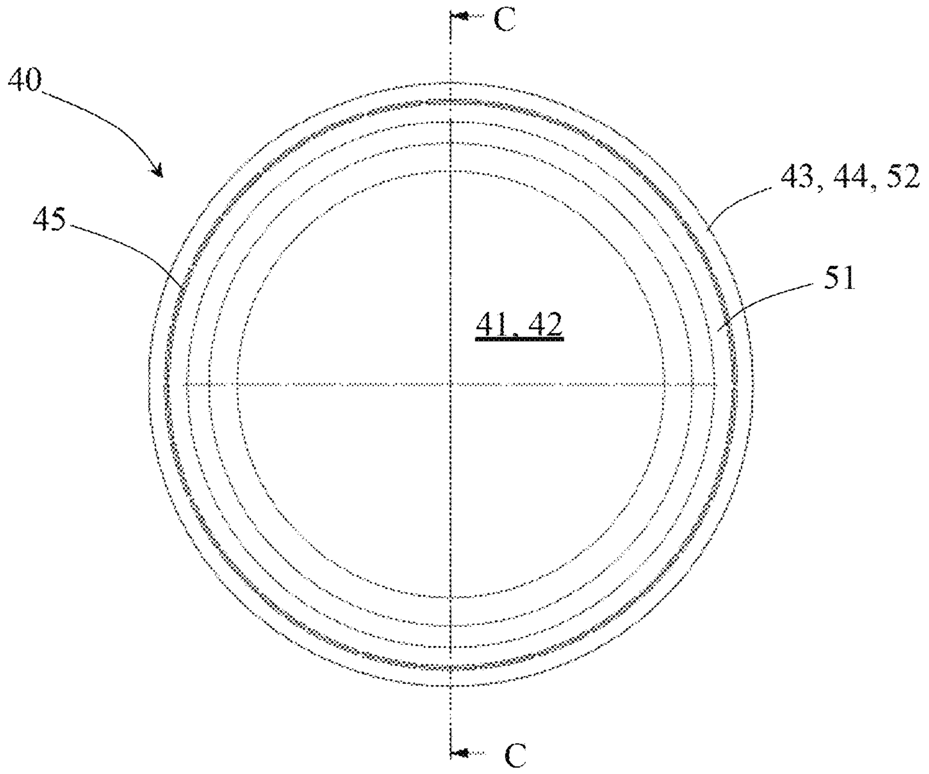
FIG. 14 is a bottom view of the upper end cap of FIG. 13.
Figure 15:
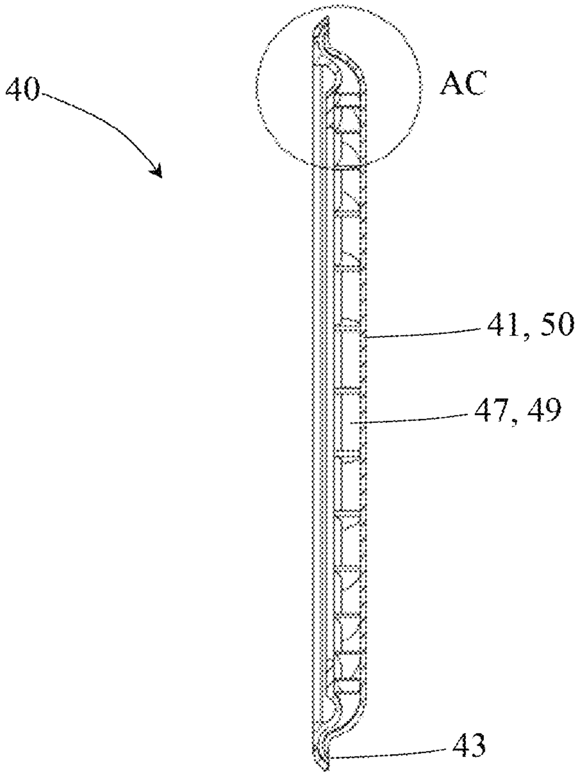
FIG. 15 is a longitudinal cross-sectional view of the upper end cap of FIG. 14 along a section line C-C.
Figure 16:
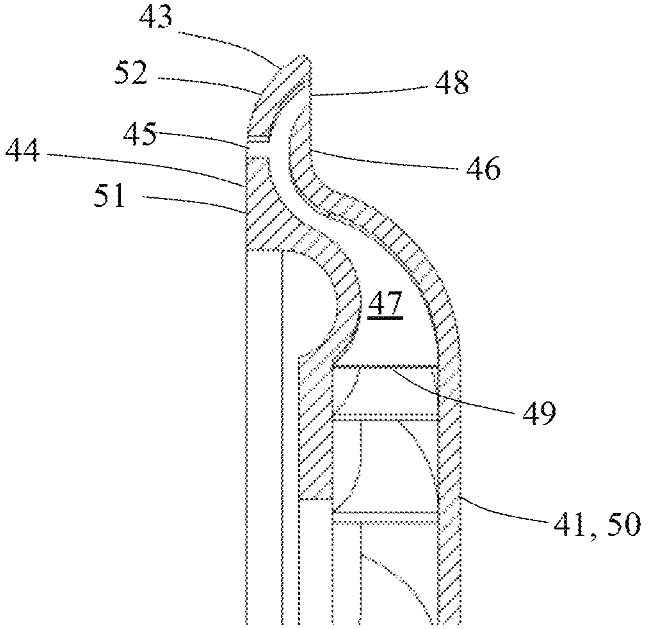
FIG. 16 is an enlarged view of a local portion AC of FIG. 15.

In an exemplary embodiment as shown in FIGS. 5 and 6, the upper end cap 2 may have 12 L-shaped members 24 and six mounting holes 23 for the fasteners 5; each mounting hole 23 is between two corresponding L-shaped members 24, or between two corresponding second spacers 26. These L-shaped members 24 form 12 flow channels.

Figure 18:
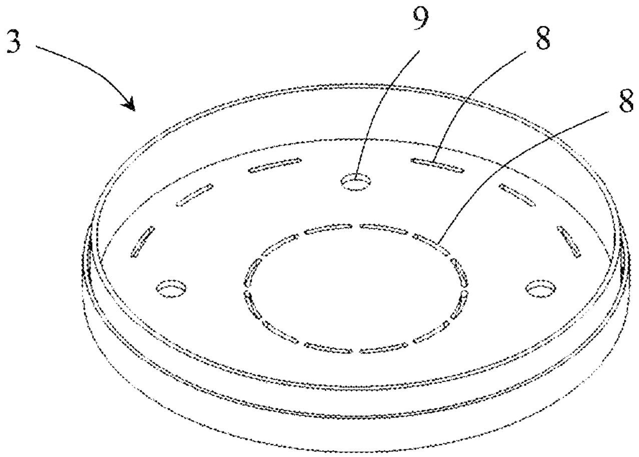
FIG. 18 is a perspective view of a lower end cap of the base station antenna in FIG. 1.

The lower end cap 3 of the base station antenna 100 is described in more detail in FIG. 18. A group of vent openings 8 on a radially inner circle and a group of vent openings 8 on a radially outer circle can be seen in FIG. 18. Each vent opening 8 is formed as one vent gap. Three of the four mounting holes 9 for the bracket 4 can also be seen in FIG. 18, although only one of the mounting holes has a reference numeral 9. A radio frequency connector is not described in FIG. 18.

When the base station antenna 100 operates in the installed state in the base station, hot air may rise and reach the external environment via the flow channel so as to diffuse heat accumulated within the base station antenna to the external environment. At the same time, ambient air may be supplemented into the radome 1 through the vent opening 8 in the lower end cap 3.

Next, a second embodiment of the upper end cap is illustrated with reference to FIGS. 7-12. The upper end cap according to the second embodiment is generally indicated by a reference numeral 30. The upper end cap 30 may replace the upper end cap 2 of the base station antenna 100 shown in FIGS. 1-6 and form a variant of the base station antenna with the remainder of the base station antenna 100 other than the upper end cap 2.

In a second embodiment of the upper end cap, the upper end cap 30 has a bottom 31 and a peripheral wall 33, the bottom 31 having an inner bottom surface 32 and an outer top surface 37. A plurality of flow channels 34 are integrated in the upper end cap 30. These flow channels 34 are in succession with each other in the circumferential direction of the upper end cap 30 and have radially inner inlets 36 and radially outer outlets 35. These outlets 35 are directed downward. The flow channel 34 may be divided into one generally radially extending first section having an inlet 36 and one generally axially extending second section having an outlet 35, and the first and second sections transition from one another via a cambered transitional section.

It is to be noted that herein, the starting point when illustrating the upper end cap is that the base station antenna is mounted substantially in a vertical direction. When the orientation of the base station antenna differs from the vertical direction, for example, the base station antenna 100 may have a certain mechanical tilt in the installed state, the orientation of the upper end cap or the components thereof will vary accordingly.

For a simple injection molding process, the upper end cap 30 may be constructed in a two-piece manner, with the main body portion of the upper end cap 30 including the bottom 31 as one injection molding component and the remainder of the upper end cap 30 facing towards the radome 1 as the other injection molding component. These two injection molding components may be connected to each other by snap-fit and/or by press fit and/or by fasteners. The upper end cap 30 may be securely connected to the radome 1 by fasteners (not shown), which may be the same or similar to the fasteners 5, and/or may form the same or similar arrangement structure as the arrangement structure of the fasteners 5.

A third embodiment according to the upper end cap of the present application is now illustrated with reference to FIGS. 13-16. The upper end cap according to the third embodiment is generally indicated by a reference numeral 40. The upper end cap 40 may replace the upper end cap 2 of the base station antenna 100 shown in FIGS. 1-6 and form another variant of the base station antenna with the remainder of the base station antenna 100 other than the upper end cap 2.

In the third embodiment of the upper end cap, the upper end cap 40 has a bottom 41 and an edge that radially extends beyond, or in other words, around the annular section 43 of the radome 1. The bottom 41 has an inner bottom surface 42 and an outer top surface 50. A plurality of flow channels 47 are integrated in the upper end cap 40 and each has an S-shaped extending direction. These flow channels 47 are in succession with each other in the circumferential direction of the upper end cap 40 and have radially inner inlets 49 and radially outer outlets 48. When the base station antenna is mounted substantially in the vertical direction, the outlet 48 of the flow channel 47 may be directed upward, or the direction of the outlet 48 of the flow channel 47 may have an upward directed component, in particular primarily having an upward directed component.

For a simple injection molding process, the upper end cap 40 may likewise be constructed in a two-piece manner, where the main body portion of the upper end cap 40 including the bottom 41 may be one injection molding component, and the remainder of the upper end cap 40 facing towards the radome 1 may be used as the other injection molding component. These two injection molding components may be connected to each other by snap-fit and/or by press fit and/or by fasteners. The upper end cap 40 may be securely connected to the radome 1 by fasteners not shown, which may be the same or similar to the fasteners 5, and/or may form the same or similar arrangement structure as the arrangement structure of the fasteners 5. The annular section 43 has a planar upper surface 46 and has a lower surface 44. The outlet 48 of the flow channel 47 may be routed from the planar upper surface 46. With reference to the longitudinal central axis of the base station antenna, the lower surface 44 has a planar first annular portion 51 radially inner and a radially outer second annular portion 52 that converges from the first annular portion 51 toward the planar upper surface 46. The flow channel 47 may be provided with a drop gap 45 for discharging droplets from the flow channel 47, and the drop gap 45 may be branched from the flow channel 47 and routed through the first annular portion 51.

When the base station antenna with the upper end cap 40 as in the third embodiment operates in the installed state in the base station, hot air may rise and reach the external environment via the flow channel so as to diffuse heat accumulated within the base station antenna to the external environment. At the same time, ambient air may be supplemented into the radome 1 through the vent opening 8 in the lower end cap 3. In addition, under solar illumination, particularly during midsummer, upward airflows may generally be formed in the external environment of the base station antenna. By following the special design of the upper end cap 40 of the present application, the upward airflow in the external environment may facilitate the flow of hot air out of the exterior of the radome via the flow channel 47 to the external environment and improve the heat dissipation performance of the base station antenna.

Again, it is to be noted that herein, the starting point when illustrating the upper end cap is that the base station antenna is mounted substantially in a vertical direction. When the orientation of the base station antenna differs from the vertical direction, the orientation of the upper end cap or the components thereof will vary accordingly. For example, when the base station antenna may have a mechanical tilt of 10°, in other words, the longitudinal central axis of the base station antenna has an included angle of 10° with the vertical direction, the above-mentioned "upward directed outlet" has an included angle of 10° with the vertical direction as well.

Figure 17:
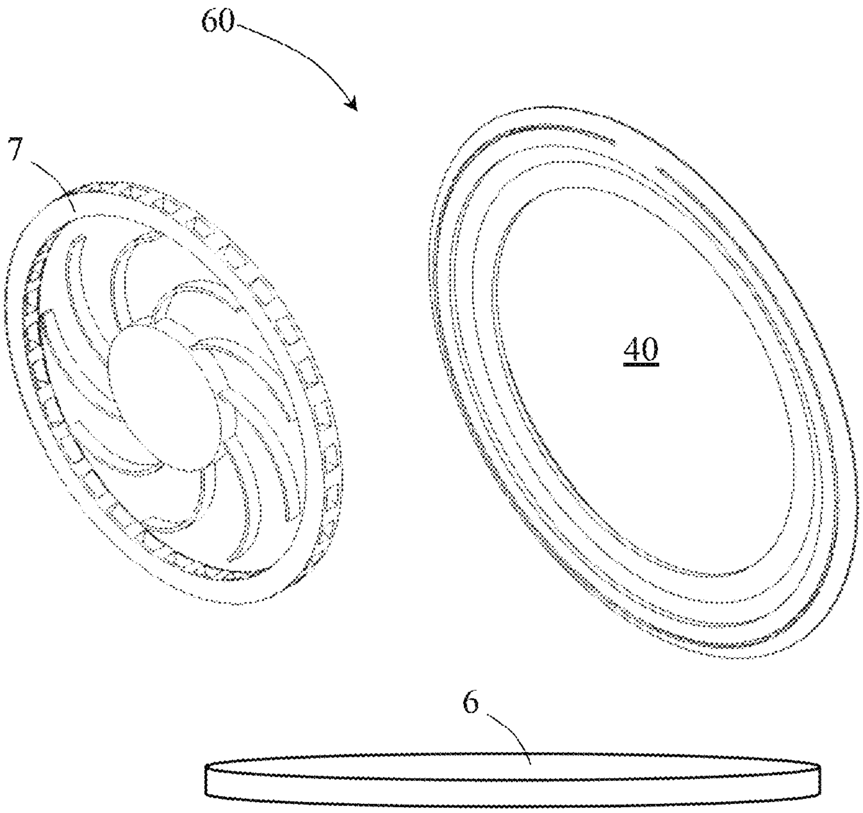
FIG. 17 is an exploded view of an upper end cap assembly according to an embodiment of the present application.

Finally, with reference to the upper end cap assembly 60 illustrated in FIG. 17, the upper end cap assembly 60 may replace the upper end cap 2 of the base station antenna 100 shown in FIGS. 1-6 and form another variant of the base station antenna with the remainder of the base station antenna 100 other than the upper end cap 2. The upper end cap assembly 60 may include the upper end cap 40 as shown in FIGS. 13-16, and additionally include a solar cell 6 and a fan 7. The solar cell 6 may be mounted on the outer top surface 50 of the bottom 41 of the upper end cap 40. The fan 7 may be mounted on the inner bottom surface 42 of the bottom 41 of the upper end cap 40. The solar cell 6 may be configured to supply power to the fan 7. The fan 7 may be configured to forcibly transport air inside the radome toward the flow channel 47, more particularly the inlet 49 of the flow channel 47, thereby facilitating heat dissipation of the base station antenna. A line, not shown, for electrically connecting the solar cell 6 and fan 7, as well as attached electrical and/or electronic components not shown may be at least partially embedded in the material of the upper end cap 40 in an injection molding process. Advantageously, the solar cell 6 and fan 7 are capable of being manipulated such that drive power of the fan 7 is related to light intensity of sunlight incident on the solar cell 6. This implements adaptive ventilation and heat dissipation of the base station antenna. In the case of strong sunlight, the solar cell 6 may acquire more energy from the incident sunlight and thereby be able to supply more energy to the fan 7, which may be driven more vigorously to deliver more airflow from inside the radome to the external environment via the flow channel.

It may be understood that other power sources can be used to replace the solar cell to drive the fan.

It may be understood that the solar cell 6 and/or fan may alternatively be applied in the embodiment as shown in FIGS. 1-6 and in the embodiment as shown in FIGS. 7-12.

It should be noted that the terminology used here is only for the purpose of describing specific aspects, and not for limiting the disclosure. The singular forms "a" and "the one" as used herein shall include plural forms, unless the context explicitly states otherwise. It can be understood that the terms "including" and "inclusive" and other similar terms, when used in the application documents, specify the existence of the stated operations, elements and/or components, and do not exclude the existence or addition of one or more other operations, elements, components and/or combinations thereof. The term "and/or" as used herein includes all of any combinations of one or more relevant listed items. In the description of the attached drawings, similar reference numerals always indicate similar elements.

The thickness of the elements in the attached drawings may be exaggerated for clarity. In addition, it can be understood that if an element is referred to as being on, coupled to, or connected to, another element, then the said element may be directly formed on, coupled to, or connected to the other element, or there can be one or more intervening elements between them. Conversely, if the expressions "directly on", "directly coupled to" and "directly connected to" are used herein, it means that there are no intervening elements. Other words used to describe the relationship between elements should be interpreted similarly, such as "between" and "directly between", "attached" and "directly attached", "adjacent" and "directly adjacent" and so on.

Terms such as "top", "bottom", "upper", "lower", "above", "below", etc. herein are used to describe the relationship of one element, layer or region with respect to another element, layer or region as shown in the attached drawings. It can be understood that in addition to the orientations described in the attached drawings, these terms should also include other orientations of the device.

It can be understood that although the terms "first", "second", etc. may be used herein to describe different elements, these elements should not be limited by these terms. These terms are only used to distinguish one element from another. Therefore, the first element can be referred to as the second element without departing from the teachings of the concept of the present disclosure.

It may also be considered that all the exemplary embodiments disclosed herein may be arbitrarily combined with each other.

Finally, it should be pointed out that the aforementioned examples are only used to understand the present disclosure, and do not limit the protection scope of the present disclosure. For those of ordinary skill in the art, modifications can be made on the basis of the aforementioned examples, and these modifications do not depart from the protection scope of the present disclosure.

The invention claimed is:

1. A base station antenna, wherein the base station antenna comprises a radome and a reflector assembly housed within the radome having an open upper end portion that is closed by an upper end cap, the base station antenna has a ventilation system that comprises a flow channel disposed in the upper end cap or disposed between the upper end cap and the upper end portion of the radome, and the flow channel is configured for venting from the inside of the radome through the flow channel to an external environment;

wherein the base station antenna comprises a plurality of flow channels distributed circumferentially with reference to a longitudinal central axis of the base station antenna; and wherein the base station antenna comprises a plurality of first spacers and a plurality of second spacers distributed circumferentially with reference to the longitudinal central axis of the base station antenna, the first spacers are disposed between an edge of the upper end portion of the radome and an inner bottom surface of a bottom of the upper end cap, and the second spacers are disposed between an outer peripheral surface of the upper end portion of the radome and an inner peripheral surface of a peripheral wall of the upper end cap, so that the plurality of flow channels are formed between the upper end cap and the upper end portion of the radome.

2. The base station antenna according to claim 1, wherein each first spacer and a corresponding second spacer form an L-shaped member that is integrally molded with the upper end cap.

3. The base station antenna according to claim 2, wherein the upper end cap is fastened on the upper end portion of the radome by a plurality of fasteners, and each fastener passes through the peripheral wall of the upper end cap and a peripheral wall of the radome between two corresponding L-shaped members.

4. The base station antenna according to claim 1, wherein the base station antenna comprises a fan disposed on an inner bottom surface of a bottom of the upper end cap, and the fan is configured to forcibly transport air inside the radome toward the flow channel.

5. The base station antenna according to claim 4, wherein the base station antenna comprises a solar cell disposed on an outside top surface of the bottom of the upper end cap, and the solar cell is configured to supply power to the fan.

6. The base station antenna according to claim 5, wherein the solar cell and fan are capable of being manipulated such that drive power of the fan is related to light intensity of sunlight incident on the solar cell.

7. The base station antenna according to claim 1, wherein the reflector assembly is circumferentially enclosed by a plurality of reflectors and is substantially closed circumferentially, and the reflector assembly has an annular support member on an upper end portion thereof adjacent to the upper end portion of the radome, with reference to the longitudinal central axis of the base station antenna.

8. The base station antenna according to claim 7, wherein the reflector assembly is circumferentially enclosed by four reflectors and has a substantially square cross-section, and the support member is squarely constructed and has a square central opening, with reference to the longitudinal central axis of the base station antenna.

9. The base station antenna according to claim 1, wherein the radome has an open lower end portion, the lower end portion of the radome is closed by a lower end cap, and the lower end cap has a vent opening.

10. A base station antenna, wherein the base station antenna comprises a radome and a reflector assembly housed within the radome having an open upper end portion that is closed by an upper end cap, the base station antenna has a ventilation system that comprises a flow channel disposed in the upper end cap or disposed between the upper end cap and the upper end portion of the radome, and the flow channel is configured for venting from the inside of the radome through the flow channel to an external environment;

wherein the base station antenna comprises a plurality of flow channels distributed circumferentially with reference to a longitudinal central axis of the base station antenna;

wherein the upper end cap has the plurality of flow channels; and wherein the flow channel has an outlet directed downward.

11. The base station antenna according to claim 10, wherein the base station antenna comprises a fan disposed on an inner bottom surface of a bottom of the upper end cap, and the fan is configured to forcibly transport air inside the radome toward the flow channel.

12. The base station antenna according to claim 10, wherein the reflector assembly is circumferentially enclosed by a plurality of reflectors and is substantially closed circumferentially, and the reflector assembly has an annular support member on an upper end portion thereof adjacent to the upper end portion of the radome, with reference to the longitudinal central axis of the base station antenna.

13. The base station antenna according to claim 10, wherein the radome has an open lower end portion, the lower end portion of the radome is closed by a lower end cap, and the lower end cap has a vent opening.

14. A base station antenna, wherein the base station antenna comprises a radome and a reflector assembly housed within the radome having an open upper end portion that is closed by an upper end cap, the base station antenna has a ventilation system that comprises a flow channel disposed in the upper end cap or disposed between the upper end cap and the upper end portion of the radome, and the flow channel is configured for venting from the inside of the radome through the flow channel to an external environment;

wherein the base station antenna comprises a plurality of flow channels distributed circumferentially with reference to a longitudinal central axis of the base station antenna;

wherein the upper end cap has the plurality of flow channels; and wherein the flow channel has an S-shaped extension direction, and a direction of an outlet of the flow channel is directed upward, or the direction of the outlet of the flow channel has an upward directed component.

15. The base station antenna according to claim 14, wherein the flow channel is provided with a drop gap for discharging droplets from the flow channel in a section of the upper end cap radially beyond the radome, with reference to the longitudinal central axis of the base station antenna.

16. The base station antenna according to claim 14, wherein the upper end cap has an annular section radially beyond the radome with reference to the longitudinal central axis of the base station antenna, the annular section has a planar upper surface and a lower surface, and the lower surface has a planar first annular portion radially interior and a second annular portion gathered from the first annular portion towards the planar upper surface and radially outward of the flow channel, wherein the outlet of the flow channel is routed through the planar upper surface; and the flow channel is provided with a drop gap for discharging droplets from the flow channel, and the drop gap is branched from the flow channel and is routed through the first annular portion.

17. The base station antenna according to claim 14, wherein the base station antenna comprises a fan disposed on an inner bottom surface of a bottom of the upper end cap, and the fan is configured to forcibly transport air inside the radome toward the flow channel.

18. The base station antenna according to claim 14, wherein the reflector assembly is circumferentially enclosed by a plurality of reflectors and is substantially closed circumferentially, and the reflector assembly has an annular support member on an upper end portion thereof adjacent to the upper end portion of the radome, with reference to the longitudinal central axis of the base station antenna.

19. The base station antenna according to claim 14, wherein the radome has an open lower end portion, the lower end portion of the radome is closed by a lower end cap, and the lower end cap has a vent opening.

* * * * *